United States Patent
Jourdan et al.

(10) Patent No.: US 6,898,699 B2
(45) Date of Patent: May 24, 2005

(54) RETURN ADDRESS STACK INCLUDING SPECULATIVE RETURN ADDRESS BUFFER WITH BACK POINTERS

(75) Inventors: Stephan J. Jourdan, Portland, OR (US); John Alan Miller, Portland, OR (US); Namratha Jaisimha, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 10/029,128

(22) Filed: Dec. 21, 2001

(65) Prior Publication Data

US 2003/0120906 A1 Jun. 26, 2003

(51) Int. Cl.[7] ................................................. G06F 9/42
(52) U.S. Cl. ........................ 712/243; 712/242; 712/238
(58) Field of Search ................................. 712/238, 237, 712/242, 243

(56) References Cited

U.S. PATENT DOCUMENTS

| | | | | |
|---|---|---|---|---|
| 5,964,868 A | * | 10/1999 | Gochman et al. | 712/234 |
| 5,974,543 A | * | 10/1999 | Hilgendorf et al. | 712/240 |
| 6,151,671 A | | 11/2000 | D'Sa et al. | |
| 6,314,512 B1 | | 11/2001 | Branson et al. | |
| 6,374,350 B1 | * | 4/2002 | D'Sa et al. | 712/239 |

* cited by examiner

*Primary Examiner*—Eddie Chan
*Assistant Examiner*—Shane Gerstl
(74) *Attorney, Agent, or Firm*—Fish & Richardson P.C.

(57) ABSTRACT

An apparatus for storing predicted return addresses of instructions being executed by a pipelined processor, the apparatus includes a two part return address buffer that includes a speculative return address buffer and a committed return address buffer, both of which having multiple entries that may include predicted return addresses that have been pushed onto the return buffer.

23 Claims, 8 Drawing Sheets

RETURN ADDRESS STACK INCLUDING SPECULATIVE RETURN ADDRESS BUFFER WITH BACK POINTERS

BACKGROUND

This invention relates to storing and retrieving return addresses.

A system architecture describes the mode of operation of a processor and mechanisms to support operating systems and executives, including system-oriented registers and data structures and system-oriented instructions. The system architecture also provides support necessary for switching between real-address and protected modes.

Execution of instructions in a pipelined processor often requires predicting the path of execution before the results of branch instructions may be known. A return stack buffer (RSB) is often used to store predicted return addresses for subroutine CALL and RETURN instructions.

DETAILED DESCRIPTION

Figure 1:
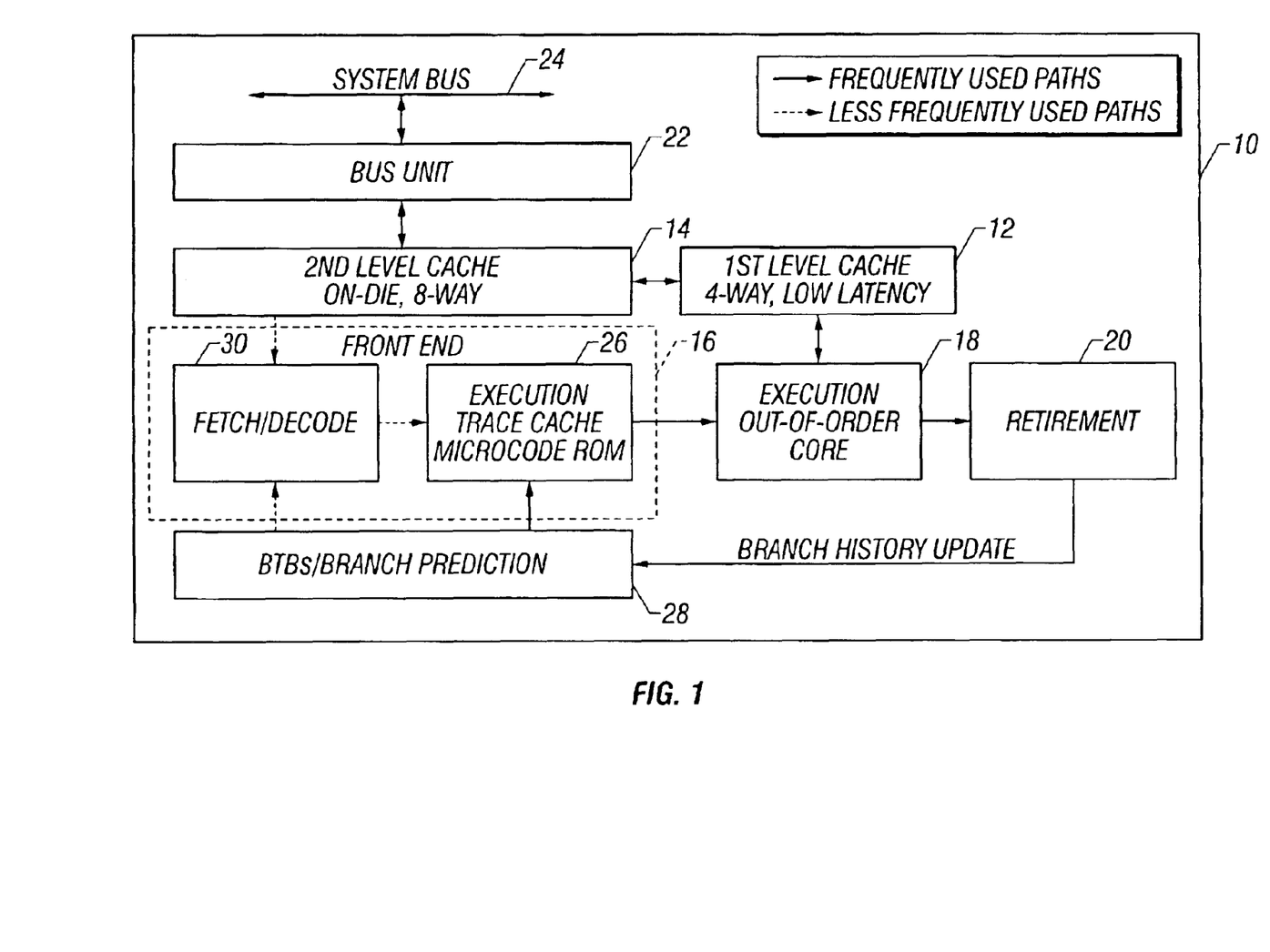
FIG. 1 is a block diagram of a processor.

Referring to FIG. 1 a processor 10 is shown. The processor 10 is a super-scalar, pipelined architecture. The term "super-scalar" means that, using parallel processing techniques, the processor 10 may decode, dispatch, and complete execution (retire) of multiple instructions per clock cycle (on average). To handle this level of instruction throughput, the processor 10 uses a decoupled, multiple stage pipeline that supports out of order instruction execution. The micro architecture pipeline of the processor 10 is divided into several sections, i.e., a first level cache 12 and a second level cache 14, a front end 16, an out of order execution core 18, and a retirement section 20. Instructions and data are supplied to these units through a bus interface unit 22 that interfaces with a system bus 24. The front end 16 supplies instructions in program order to the out of order core 18 that has very high execution bandwidth. The front end 16 fetches and decodes instructions, and breaks the instructions down into simple operations called micro-ops ($\mu$-ops). The front end 16 can issue multiple p-ops per cycle, in original program order, to the out of order core 18. The front end 16 performs several basic functions. For example, the front end 16 performs prefetching of instructions that are likely to be executed, fetching instructions that have not already been prefetched, decoding instructions into micro operations, generating micro code for complex instructions and special purpose code, delivering decoded instructions from an execution trace cache 26, and predicting branches using advanced algorithms in a branch prediction unit 28. The front end 16 of the processor 10 minimizes the time to decode instructions fetched from the target and minimizes wasted decode bandwidth due to branches or branch target in the middle of cache lines.

The execution trace cache 26 stores decoded instructions. Instructions are fetched and decoded by a translation engine (not shown) and built into sequences of $\mu$-ops called traces. These traces of $\mu$-ops are stored in the trace cache 26. The instructions from the most likely target of a branch immediately follow the branch without regard for continuity of instruction addresses. Once a trace is built, the trace cache 26 is searched for the instruction that follows that trace. If that instruction appears as the first instruction in an existing trace, the fetch and decode of instructions 30 from the memory hierarchy ceases and the trace cache 26 becomes the new source of instructions.

The execution trace cache 18 and the translation engine (not shown) have cooperating branch prediction hardware. Branch targets are predicted based on their linear addresses using Branch Target Buffers (BTBS) 28 and fetched as soon as possible. The branch targets are fetched from the trace cache 26 if they are indeed cached there; otherwise, they are fetched from memory e.g., cache or main memory. The translation engine's branch prediction information is used to form traces along the most likely paths.

The execution core 18 executes instructions out of order, which enables the processor 10 to reorder instructions so that if one $\mu$-op is delayed while waiting for data or a contended execution resource, other $\mu$-ops that are later in program order may proceed around it. The processor 10 employs several buffers to smooth the flow of $\mu$-ops. This implies that when one portion of the pipeline experiences a delay that delay may be covered by other operations executing in parallel or by the execution of $\mu$-ops which were previously queued up in a buffer.

The core 18 is designed to facilitate parallel execution. The core 18 can dispatch multiple $\mu$-ops per cycle. Most pipelines can start executing a new $\mu$-op every cycle, so that several instructions can be processed any time for each pipeline.

The retirement section 20 receives the results of the executed $\mu$-ops from the execution core 18 and processes the results so that the proper architectural state is updated according to the original program order. For semantically correct execution, the results of instructions are committed in original program order before it is retired. Exceptions may be raised as instructions are retired. Thus, exceptions cannot occur speculatively. They occur in the correct order, and the processor 10 can be correctly restarted after execution.

When a $\mu$-op completes and writes its result to the destination, it is retired. A ReOrder Buffer (ROB) (not shown) in the retirement section 20 is the unit in the processor 10 which buffers completed $\mu$-ops, updates the architectural state in order, and manages the ordering of exceptions.

The retirement section 20 also keeps track of branches and sends updated branch target information to the BTB 28 to update branch history. In this manner, traces that are no longer needed can be purged from the trace cache 26 and new branch paths can be fetched, based on updated branch history information.

In a pipelined processor, such as processor 10, instructions are "speculatively" fetched by front end 16 from first level cache 12 and second level cache 14. Speculatively fetching instructions refers to predicting the path of execution of a set of instructions being executed in a pipeline, that is, having to predict a path of fetched instructions before the decoding of those instruction can be completed. Predicting a path of execution includes predicting a RETURN address that may follow a sub-routine CALL instruction. A subroutine CALL instruction is sometimes referred to as an "unconditional branch" instruction.

In the case of unconditional branch instructions, such as subroutine CALLs, a return stack buffer (RSB) is often used to store predicted RETURN addresses that may follow the CALL instruction. Using a traditional RSB, predicted RETURN addresses are pushed onto the RSB for each CALL instruction fetched, and the predicted RETURN address is popped from the stack when a RETURN instruction is predicted. A pointer to the top of the RSB stack (TOS) is incremented with each push of an address onto RSB, and decremented with each pop of an address from RSB. In some cases, when speculatively fetching instructions, the traditional RSB structure fails to preserve a predicted RETURN address. For example, a first CALL instruction (CALL1) is fetched, its predicted return address (RETURN1) is pushed onto the stack (often, the predicted return address is the address immediately after the address of the CALL instruction). After RETURN1 is pushed onto RSB, TOS is incremented to point to the next entry in RSB. When a return instruction is fetched, TOS is decremented to point to the stack location holding RETURN1 address and RETURN1 is popped from the stack as the predicted return address. If a second CALL instruction (CALL2) is fetched, pushing its predicted RETURN address (RETURN2) onto RSB, RETURN1 address will be overwritten with RETURN2 address in the RSB (TOS having remained the same). If the predicted path of execution for the return instruction is not correct (for example if an intervening branch instruction result is mis-predicted), RETURN1 address will be lost (it is no longer on RSB, having been over-written with RETURN2 address). Therefore, the next return instruction fetched will be mis-predicted as having a RETURN2 address instead of the RETURN1 address.

Figure 2A:
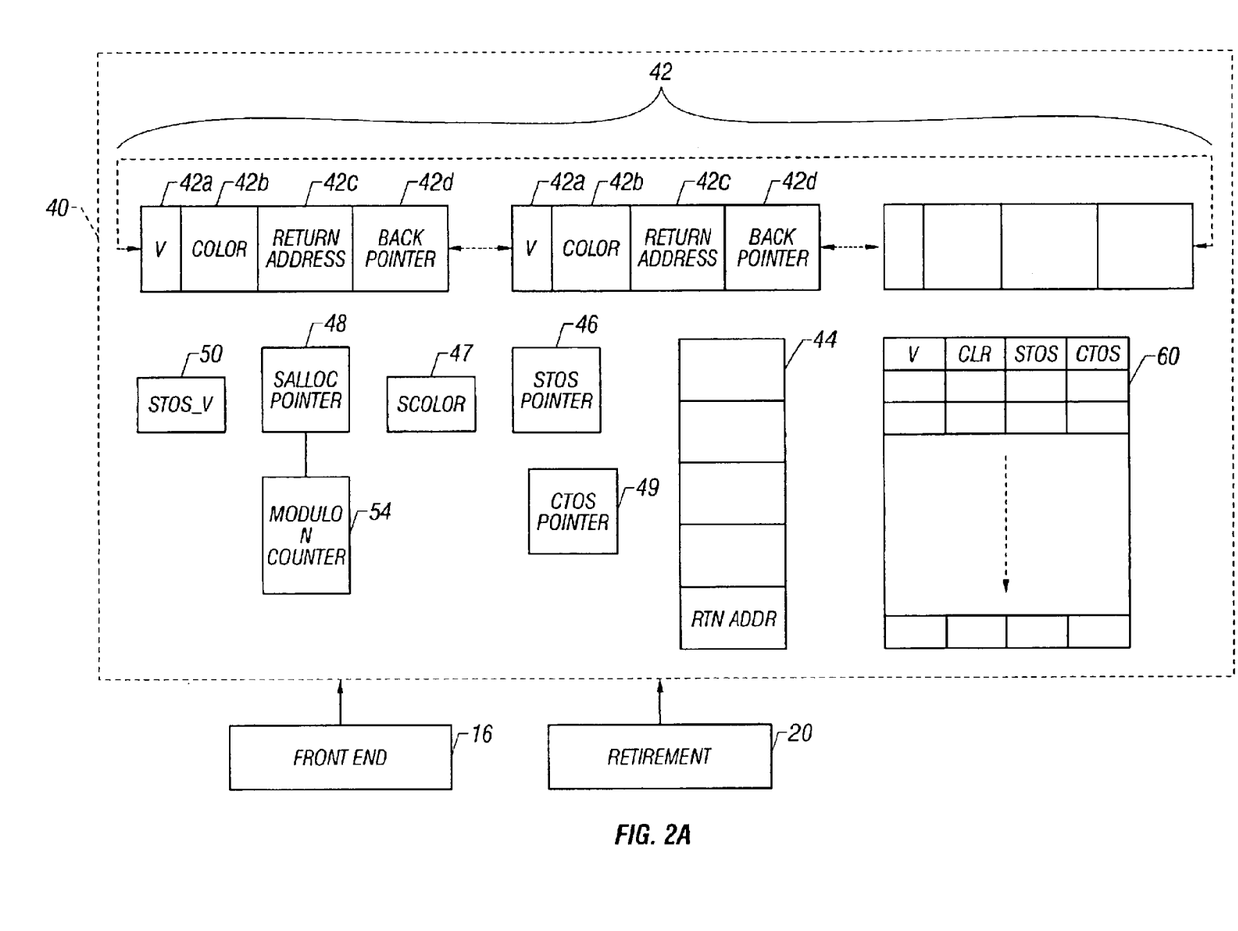
FIG. 2A is a block diagram of an first embodiment of a return address stack.

Referring to FIG. 2A, in a first embodiment, processor 10 includes a two part return address buffer 40, which can be part of the the Branch Target Buffers (BTBS) 28 (FIG. 1). The return address buffer 40 stores predicted RETURN addresses and allows recovery of predicted RETURN addresses in the case of mis-predicted instruction fetching (as described above). Address buffer 40 includes a Speculative RSB 42 (SRSB 42) and a Committed RSB (CRSB 44), both of which having multiple entries that may include predicted return addresses that have been pushed onto buffer 40 by front end 16. When a predicted return address stored in buffer 40 is popped by front-end 16, the predicted return address may come from either SRSB 42 or CRSB 44.

SRSB 42 entries are up-dated when front-end 16 fetches a new CALL instruction and pushes a new predicted return address onto buffer 40 (typically, the predicted return address is the next instruction after the CALL instruction). If all of the SRSB 42 entries are full, an SRSB entry will be over-written with the new return address. Whenever an SRSB 42 entry is determined to have been over-written, a popped return address will be read from CRSB 44. Also, when retirement 20 retires a CALL instruction, the corresponding return address is written out to a CRSB 44 entry, as will be explained.

SRSB 42 is implemented as a circular buffer having "N" entries (N being a programmable variable that can be set by a programmer or user of processor 10). SRSB 42 includes two pointers, a read pointer, STOS 46, and a write pointer, SALLOC 48. STOS 46 is used to point to an entry in SRSB 42 to read a predicted return address for the next RETURN instruction fetched. SALLOC 48 is used to points to an entry in SRSB 42 to write the next predicted return address when a CALL instruction is fetched.

Each entry included in SRSB 42 includes a pointer valid bit (V-bit) 42a, a color bit 42b, a return address field 42c, and a back pointer field 42d. Back pointer field 42d is used to hold the previous STOS 46 value, and is used to decrement ("back up") the STOS 46 pointer field when a return address is being popped from SRSB 42. V-bit 42a is written with the current value of STOS_V 50 whenever a return address is being pushed onto SRSB 42. V-bit 42a is used to indicate whether a back-pointer stored in 42d is valid, as will be explained. Color bit 42b is written with the current value of SCOLOR 47 whenever a return address is pushed onto SRSB 42. When an entry is popped (read) from SRSB 42, color bit 42b is used to determine if the return address included in that entry has been over-written, as will be explained. Return address field 42c is used to store a predicted return address that has been pushed onto buffer 40.

CRSB 44 includes multiple entries, each entry holding only a predicted return address. The total number of entries included in CRSB is programmable to correspond to a possible number of subroutine calls that may need to be stacked up due to the pipelined execution of instructions in processor 10. A single pointer, CTOS 49, is used for reading and writing CRSB 44 entries. CTOS 49 is implemented as a top of stack pointer, and is incremented when a CALL instruction is fetched, and decremented when a RETURN instruction is fetched. A CRSB 44 entry is written with a predicted return address from SRSB 42 whenever a CALL instruction is retired by retirement 20.

As described previously, SRSB 42 is a circular buffer that includes "N" entries. Buffer 40 includes a modulo N counter 54 that is used to increment the value of SALLOC 48, and also used to indicate the "wrapping" of STOS 46 above and below N. In more detail, as predicted return addresses are pushed onto SRSB 42, the value of SALLOC 48 is incremented with modulo N counter 54. When SALLOC 48 is incremented over N ("wrapping over N"), the lowest bit of SALLOC 48 is set to zero to point to the first entry of SRSB 42.

Buffer 40 includes a SCOLOR indicator 47 that is a single bit field used to indicate the wrapping of STOS above and below "N". In more detail, STOS 46 pointer is up-dated to equal SALLOC 48 when a predicted return address is pushed onto SRSB. Conversely, when a return address is popped from SRSB 42, STOS 46 is up-dated to equal the back pointer address 42d (the previous STOS 46 value) stored in the entry being read. In either case, if updating STOS wraps over or under N, SCOLOR 47 bit is inverted. By inverting SCOLOR 47 each time STOS wraps above or below N, SCOLOR 47 value can be compared to a COLOR 42b value stored in a SRSB entry to determine if the return address 42c stored in the same entry has been over-written.

Buffer 40 also includes a branch recovery structure stack (TBIT) 60 that is used to store pointers and status bits for branch recovery in a case of a mis-predicted branch path. Each entry in TBIT 60 includes a field for storing STOS 46, CTOS 49, STOS_V 50 and SCOLOR 47 whenever a branch instruction (conditional and un-conditional) is fetched by front end 16. If a mis-prediction occurs, the TBIT values are used to restore the pointers CTOS 49, STOS 46 and the indicator bits SCOLOR 47 and STOS_V 50.

Figure 2B:
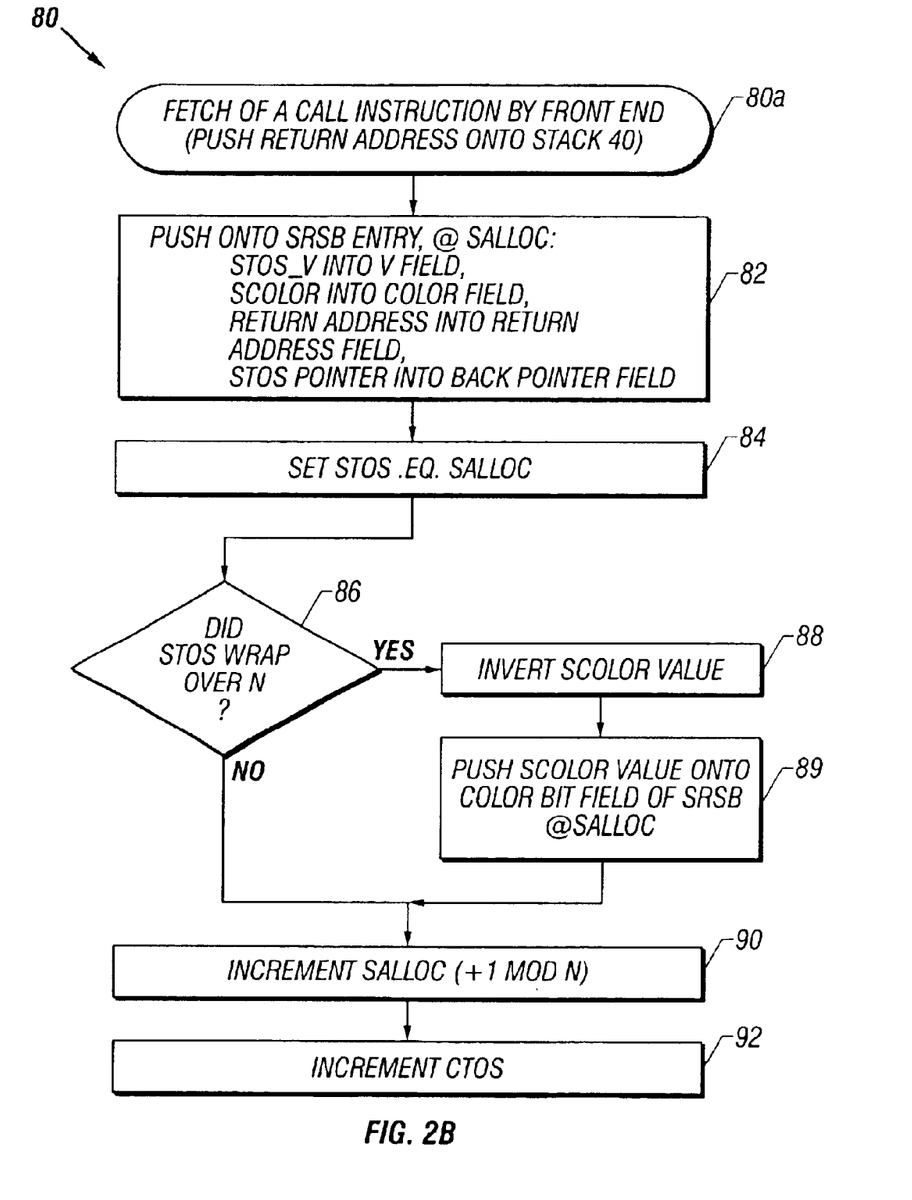
FIGS. 2B–2D are flowcharts showing a process for storing and retrieving return addresses using the stack of FIG. 2A.
Figure 2C:
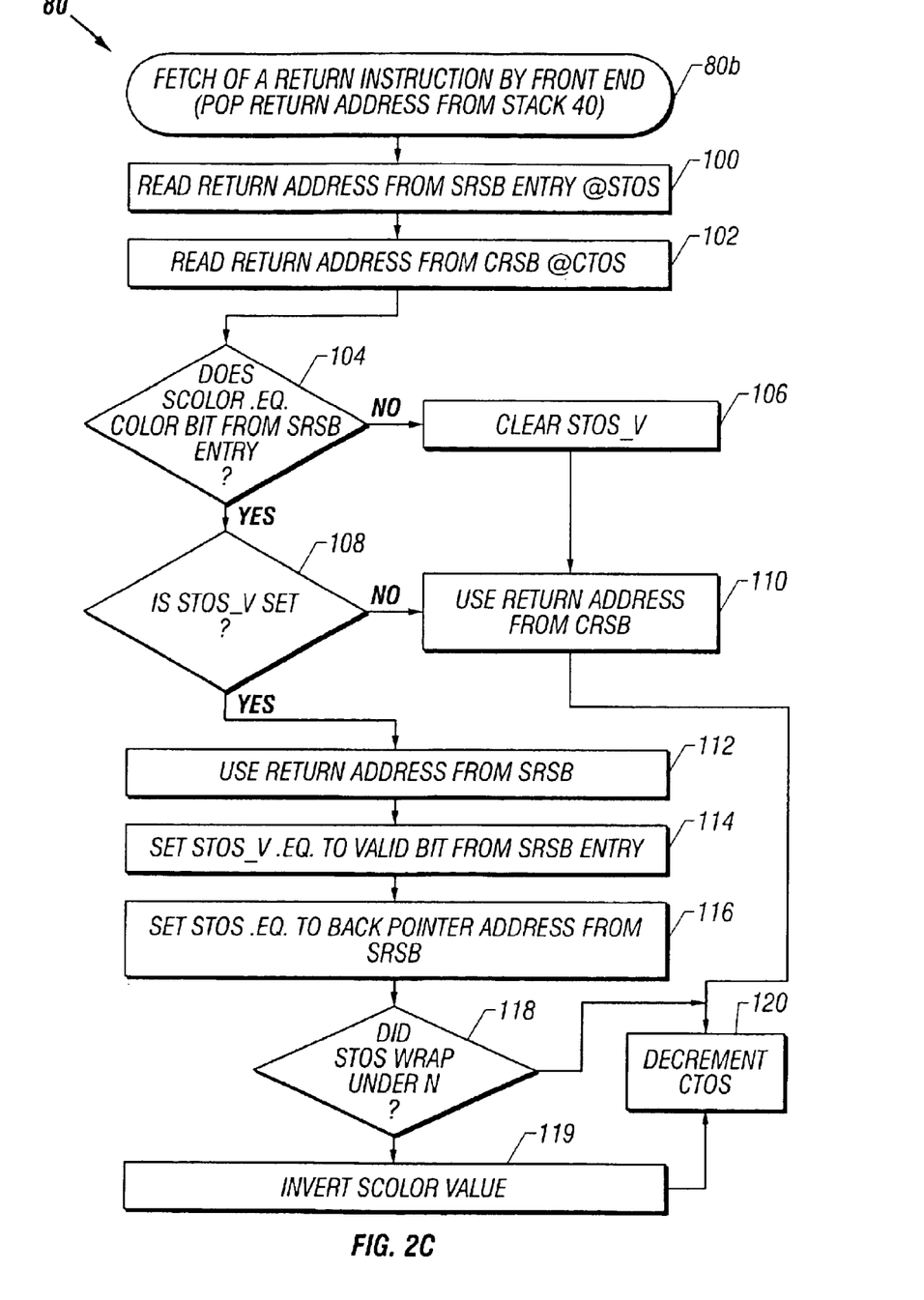
Figure 2D:
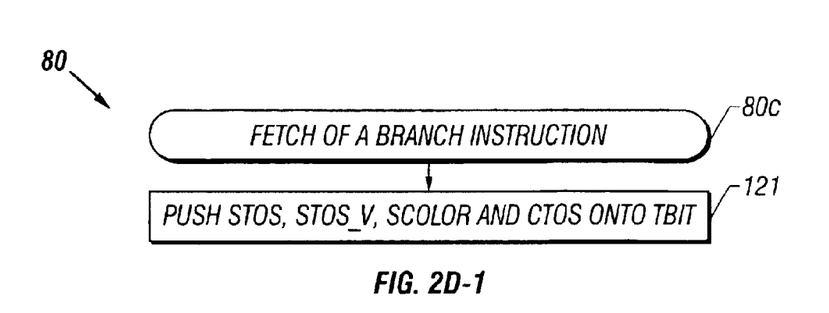
Figure 2D:
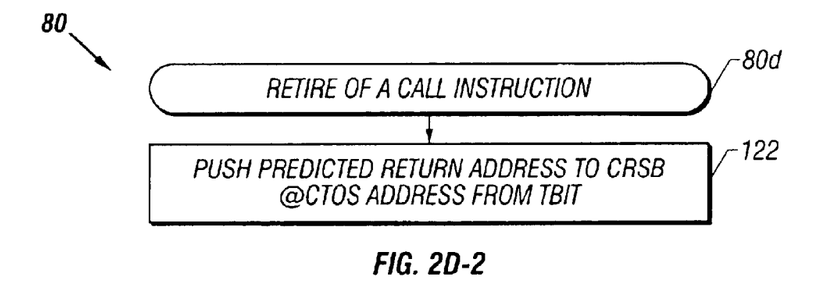
Figure 2D:
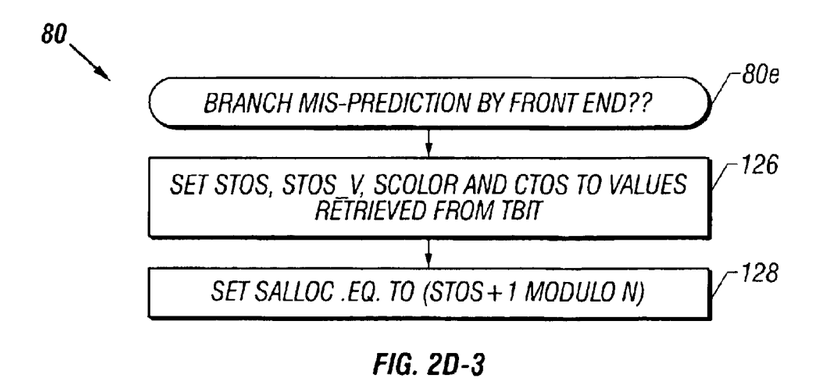

A process 80 for storing and retrieving return addresses using buffer 40 is shown in FIGS. 2B–2D. Process 80 includes several separate sub-processes, 80a–80e, for performing different store or retrieve operations on buffer 40, as shown in FIG. 2A.

Sub-process 80a includes a sequence of actions, 82–92, that are performed when a CALL instruction is fetched by front end 16. Sub-process 80a includes pushing (82) STOS, STOS_V, SCOLOR and the return address being pushed by front end 16 onto a SRSB 42 entry at the SALLOC location. Sub-process 80a then sets (84) STOS equal to the current SALLOC pointer address. Sub-process 80a then determines (86) if STOS wrapped over N, and if it did, sub-process 80a inverts (88) SCOLOR 47, and also pushes the inverted SCOLOR 47 bit onto COLOR 42b field of the SRSB 42 entry at the SALLOC location. Sub-process 80a increments (90) SALLOC by one modulo-N. Sub-process 80a increments (92) CTOS.

Sub-process 80b includes a sequence of actions, 100–120, that are performed when a RETURN instruction is fetched by front end 16. Sub-process 80b includes reading (100) a return address stored in SRSB 42 at address STOS and reading (102) A return address stored in CRSB 44 at address CTOS. Sub-process 80b determines (104) if color bit 42b equals SCOLOR 47, if it does, sub-process 80b determines (108) if STOS_V 50 is set, and if it does, sub-process 80b uses (112) the return address read from SRSB 42 and sets (114) STOS_V 50 equal to V-bit 42a. If sub-process 80b determines (104) that SCOLOR 47 does not equal color bit 42b, sub-process 80b clears (106) STOS_V and uses (110) the return address read from CRSB. If sub-process 80b determines (108) that STOS_V is not set, sub-process 80b uses (110) the return address from CRSB. Sub-process 80b sets (116) STOS equal to the back pointer address 42c from SRSB and determines (118) whether STOS has wrapped under N. If STOS has wrapped under N, sub-process 80b inverts (119) SCOLOR, otherwise, sub-process 80b decrements (120) CTOS.

Sub-process 80c depicts the actions performed when a branch instruction is fetched by front end 16. Sub-process 80c includes pushing (121) the current values of STOS, STOS_V, SCOLOR and CTOS onto a TBIT 60 entry.

Sub-process 80d depicts the actions performed when a CALL instruction is retired by retirement 20. Sub-process 80d includes writing (122) the predicted return address for the retiring CALL instruction to CRSB at the CTOS address stored in TBIT for this CALL instruction.

Sub-process 80e depicts the actions performed when there is a branch mis-prediction by front end 16. Sub-process 80e includes setting (126) STOS, STOS_V, SCOLOR and CTOS to values stored in TBIT 60. Sub-process 80f also includes setting (128) SALLOC equal to STOS plus one modulo N.

Figure 3A:
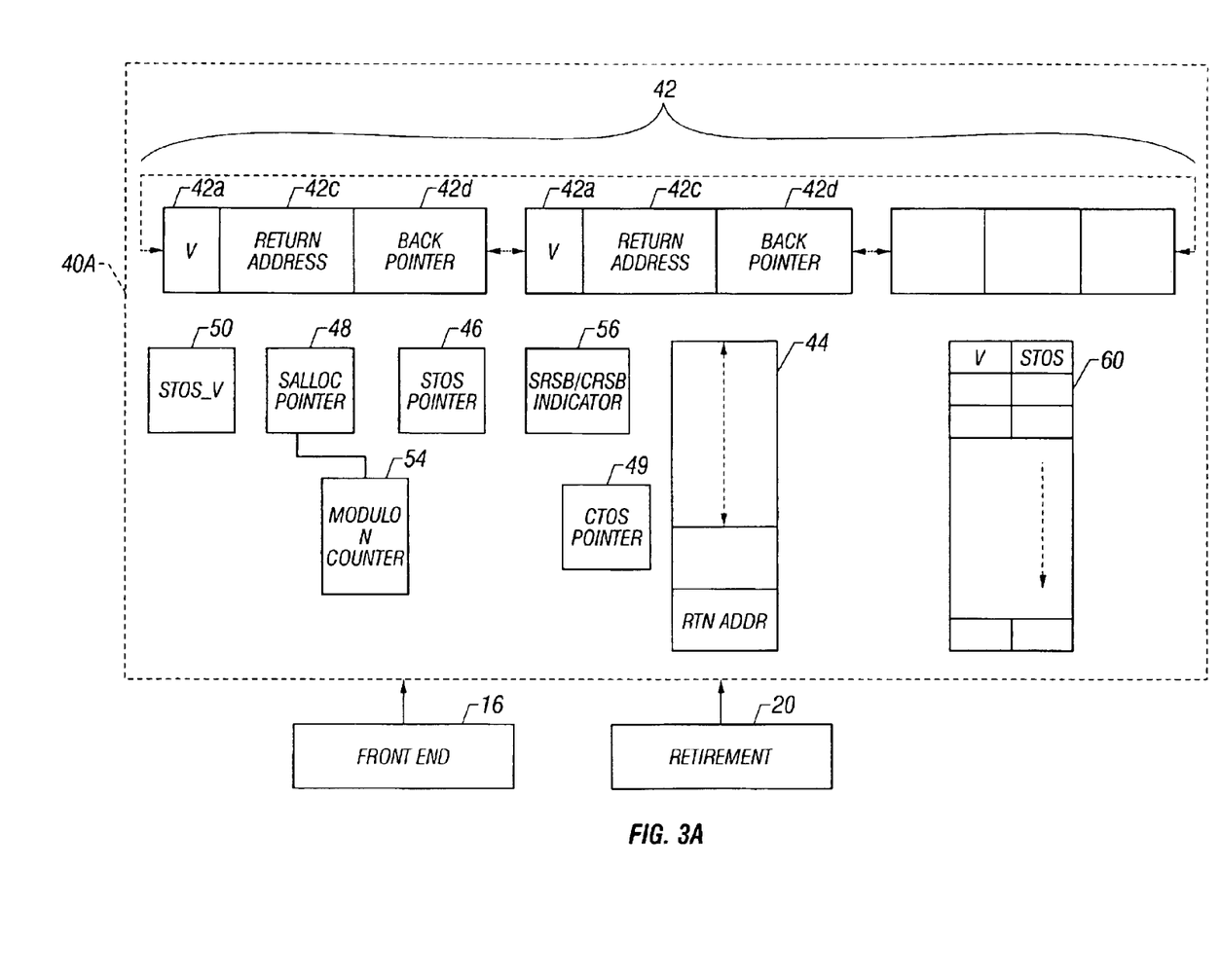
FIG. 3A is a block diagram of a second embodiment of a return address stack.
Figure 3B:
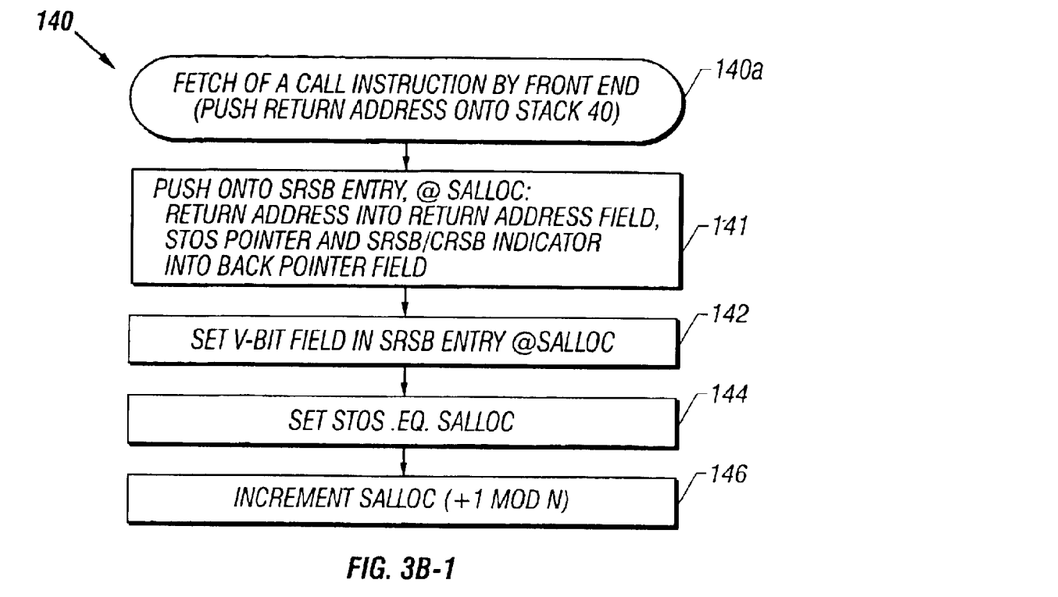
FIGS. 3B–3C are flowcharts showing a process for storing and retrieving return addresses using the stack of FIG. 3A.
Figure 3B:
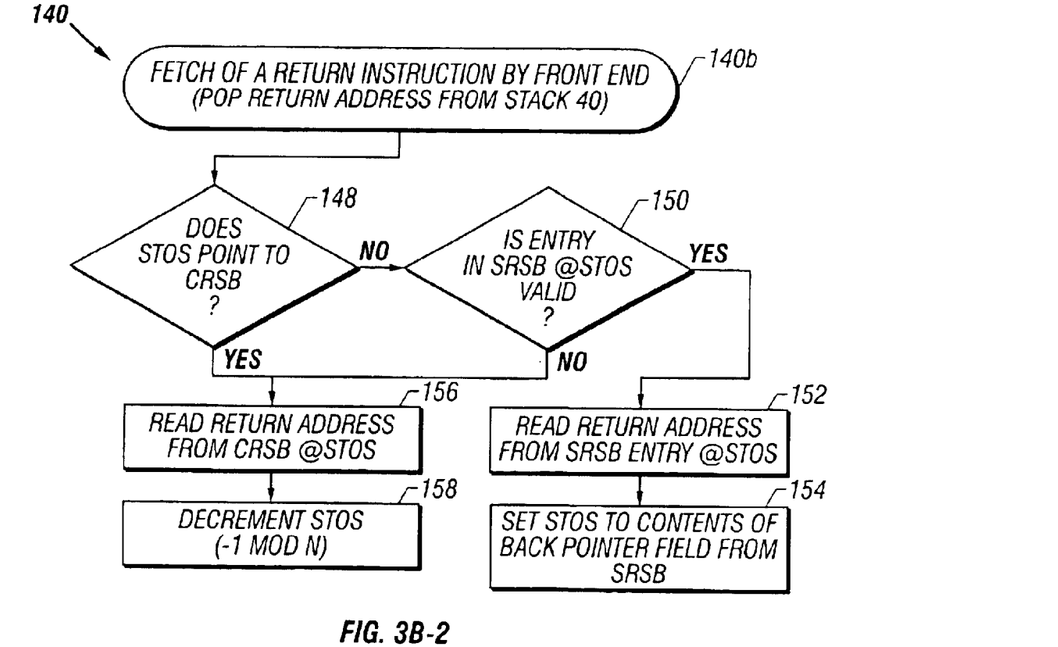
Figure 3C:
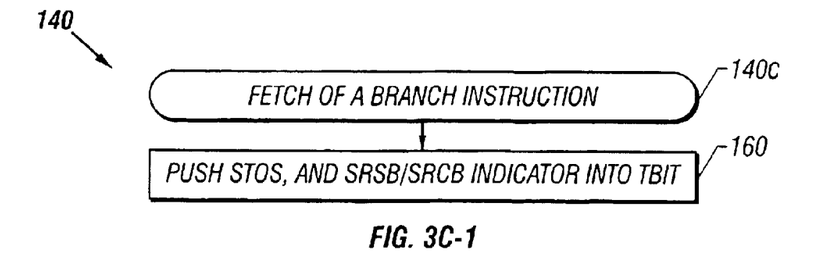
Figure 3C:
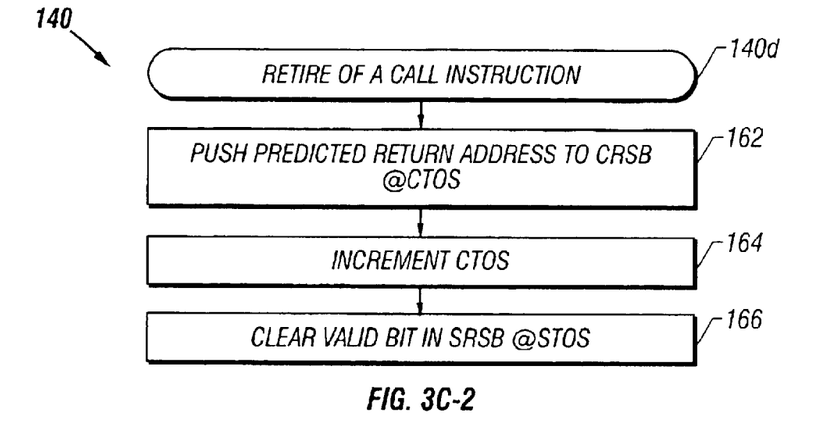
Figure 3C:
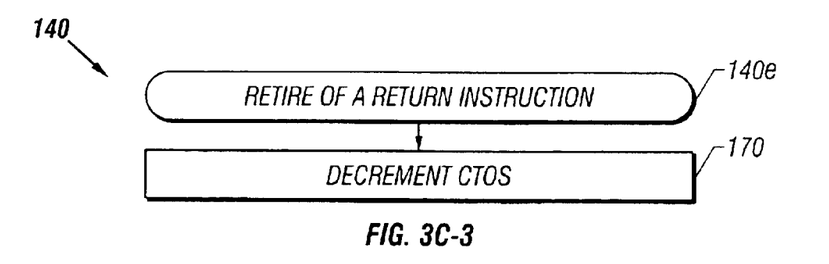
Figure 3C:
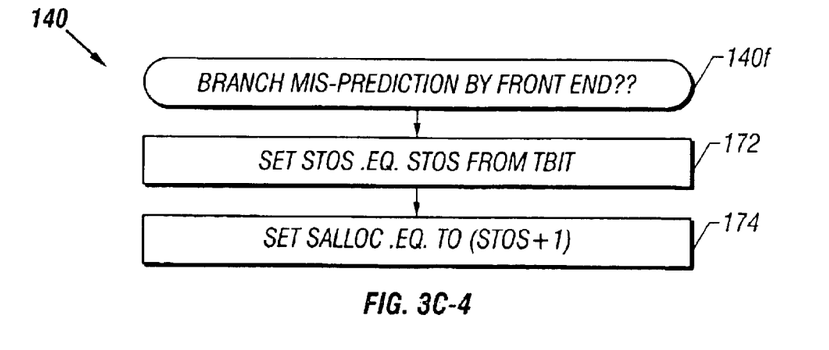

Referring to FIG. 3A, a second embodiment of a two part return address buffer 40A is shown. Buffer 40A differs from buffer 40 by not including SCOLOR 47, STOS_V 50 and not including a CTOS storage location for branch recovery in TBIT 60a. Buffer 40A also differs from buffer 40 by including a SRSB/CRSB indicator 56. During operation of buffer 40a, STOS may be used to address entries in both SRSB and CRSB. SRSB/CRSB indicator 56 is used to determine which buffer, SRSB 42 or CRSB 44, is being read from or written to, as will be explained. SRSB/CRSB indicator 56 is stored with every STOS 46 stored, that is, in both the SRSB 42 back pointer field 42d and in each TBIT entry for STOS.

Referring to FIGS. 3b–3c, a process 140 is shown for storing and retrieving return addresses using buffer 40A. Process 140 includes several separate sub-processes, 140a–140f, for performing different store or retrieve operations on buffer 40A. Process 140 differs from process 80. In more detail, during the performance of process 140 using buffer 40A, CTOS pointer 49 is only incremented when a CALL instruction is retired and only decremented when a RETURN instruction is retired. Also, since STOS may be used to address either SRSB or CRSB, indicator 56 is used to determine which buffer is to be read.

Sub-process 140a includes a sequence of actions, 141–146, that are performed when a CALL instruction is fetched by front end 16. Sub-process 140a includes pushing (141) the predicted return address into return address field 42c, STOS pointer (and SRSB/CRSB indicator 56) into back pointer field 42d of the SRSB entry pointed to by SALLOC. Sub-process includes setting (142) V-bit field 42a in SRSB entry pointed to by SALLOC. Sub-process 140a includes setting (144) STOS equal to SALLOC and incrementing (146) SALLOC with modulo N counter 54.

Sub-process 140b includes a sequence of actions, 148–158, that are performed when a RETURN instruction is fetched by front end 16. Sub-process 140b includes determining (148) if STOS points to CRSB using the SRSB/CRSB indicator 56. If sub-process 140b determines (148) that STOS points to CRSB, sub-process 140b reads (156) the return address from CRSB using the STOS pointer and decrements (158) STOS pointer 46. If sub-process 140b determines STOS does not point to CRSB, sub-process 140b determines (150) if SRSB entry pointed to by STOS is valid (V-bit 42a is set). If sub-process 140b determines (150) that SRSB entry is valid, sub-process 140b reads (152) return address from SRSB at address STOS and sets (154) STOS and SRSB/CRSB indicator 56 to equal back pointer address 42d from SRSB. If sub-process 140b determines (150) that SRSB entry is not valid, sub-process 140b reads (156) return address from CRSB at address STOS and decrements (158) STOS pointer 46.

Sub-process 140c includes an action (160) that is performed when a branch instruction is fetched by front end 16. Sub-process 140c includes pushing (160) STOS (and SRSB/CRSB indicator 56) into TBIT 60.

Sub-process 140d includes a sequence of actions, 162, 164 and 166, that are performed when a CALL instruction is retired by retirement 20. Sub-process 140d pushes the predicted return address 42c for the CALL instruction into CRSB 44 at the entry pointed to by CTOS. Sub-process 140d increments (144) CTOS. Sub-process 140d clears (146) the valid bit in the SRSB 42 entry pointed to by STOS from TBIT, if the SRSB/CRSB indicator bit is pointing to SRSB. If the SRSB/CRSB indicator bit is pointing to CRSB, the valid bit is not cleared.

Sub-process 140e includes an action, 170, that is performed when a RETURN instruction is retired by retirement 20. Sub-process 140e includes decrementing (170) CTOS.

Sub-process 140f includes a sequence of actions, 172 and 174, that are performed when a branch is mis-predicted by front end 16. Sub-process 140f includes setting (172) both STOS and SRSB/CRSB indicator 56 equal to STOS and the indicator from TBIT 60. Sub-process 140f also includes setting (174) SALLOC equal to STOS plus one.

The invention is not limited to the specific embodiments described above. We mentioned using a single bit indicator for SCOLOR 47. However, more bits could be used to implement SCOLOR which would enable more "levels" of wrapping back and forth through a circular stack buffer.

Accordingly, other embodiments are within the scope of the following claims.

What is claimed is:

1. An apparatus for storing predicted return addresses of instructions being executed by a pipelined processor, the apparatus comprising:

a two part return address buffer, comprising a speculative return address buffer; and a committed return address buffer, both of which having multiple entries that may include predicted return addresses that have been pushed onto the return buffer;

wherein the speculative return address buffer comprises a circular buffer including a back pointer field to store pointers into the two part return address buffer.

2. The apparatus of claim 1 wherein when a predicted return address stored in the two part return address buffer is popped, the predicted return address may come from either the speculative return address buffer or the committed return address buffer.

3. The apparatus of claim 2 further comprising:

a read pointer; and a write pointer;

wherein the two part return address buffer is operable to:

store a first return address in an entry in the speculative return address buffer, the entry being pointed to by the write pointer;

store a value of the read pointer in the back pointer field of the entry;

set the read pointer equal to the write pointer; and increment the write pointer.

4. The apparatus of claim 3, further comprising:

a storage device holding an SCOLOR indicator bit that is inverted each time the read pointer wraps over or under a depth N of the speculative buffer; and a bit storage location associated with each entry in the speculative buffer to hold a current value of SCOLOR each time a return address is written into the speculative buffer.

5. The apparatus of claim 3, further comprising:

retirement logic that indicates instructions that have completed execution in the processor, wherein when the retirement logic indicates an instruction has completed execution the return address corresponding to the completed instruction is written from the speculative buffer to the committed buffer.

6. The apparatus of claim 3, further comprising:

a storage location holding a pointer indicator bit to indicate the use of the speculative buffer or the committed buffer for reading a return address.

7. The apparatus of claim 6, wherein the two part return address buffer is operable to, when the pointer indicator bit indicates the speculative buffer is to be used for reading the return address, read the return address from the speculative buffer and set the read pointer equal to a value of the back pointer field of an entry being read.

8. The apparatus of claim 7, further comprising:

a retirement logic block that indicates instructions that have completed execution in the processor, wherein when the retirement logic indicates a CALL instruction has completed execution, the return address corresponding to the completed instruction is written from the speculative buffer to the committed buffer.

9. A method of storing predicted return addresses of instructions being executed by a pipelined processor, the method comprising:

pushing a return address onto a two part return address buffer, wherein the two part buffer comprises a speculative return address buffer and a committed return address buffer, both of which having multiple entries; and popping the predicted return address from the two part buffer, wherein the popped return address may come from either the speculative return address buffer or the committed address buffer;

wherein the speculative return address buffer comprises a circular buffer including a back pointer field to store pointers into the two part return address buffer.

10. The method of claim 9, further comprising:

popping a return address from the committed buffer to allow recovery of predicted RETURN addresses in the case of mis-predicted instruction fetching.

11. The method of claim 10, further comprising:

storing a first return address in an entry in the speculative buffer, the entry being pointed to by a write pointer; and reading the first return address from the entry, the entry being pointed to by a read pointer.

12. The method of claim 10, wherein pushing a return address onto the speculative buffer comprises:

storing a value of a read pointer in the back pointer field;

setting the read pointer equal to a write pointer; and incrementing the write pointer after the read pointer is set equal to the write pointer.

13. The method of claim 10, further comprising:

inverting an SCOLOR indicator bit each time a read pointer wraps over or under a depth N of the speculative buffer; and storing the SCOLOR indicator bit in an associated bit location each time a return address is written into the speculative buffer.

14. The method of claim 10, wherein upon an indication that an instruction corresponding to a return address stored in the two part buffer has completed execution, the method further comprises:

writing the return address corresponding to the completed instruction from the speculative buffer to the committed buffer.

15. The method of claim 10, further comprising, when a pointer indicator bit indicates the speculative buffer is to be used for reading the return address:

reading the return address from the speculative buffer; and setting the read pointer equal to a value of the back pointer field of an entry being read.

16. A system comprising:

a super-scalar, pipelined processor; and a two part return address buffer comprising a speculative return address buffer and a committed return address buffer, both of which having multiple entries than may include predicted return addresses that have been pushed onto the two part return address buffer;

wherein the speculative return address buffer comprises a circular buffer including a back pointer field to store pointers into the two part return address buffer.

17. The system of claim 16 wherein when a predicted return address stored in the two part return address buffer is popped, the predicted return address may come from either the speculative return address buffer or the committed return address buffer.

18. The system of claim 17 further comprising:

a read pointer; and a write pointer;

wherein the two part return address buffer is operable to:

store a first return address in an entry in the speculative return address buffer, the entry being pointed to by the write pointer;

store a value of the read pointer in the back pointer field of the entry;

set the read pointer equal to the write pointer; and increment the write pointer.

19. The system of claim 18, further comprising:

a storage device holding an SCOLOR indicator bit that is inverted each time the read pointer wraps over or under a depth N of the speculative buffer; and a bit storage location associated with each entry in the speculative buffer to hold a current value of SCOLOR each time a return address is written into the speculative buffer.

20. The system of claim 18, further comprising:

retirement logic that indicates instructions that have completed execution in the processor, wherein when the retirement logic indicates an instruction has completed execution the return address corresponding to the completed instruction is written from the speculative buffer to the committed buffer.

21. The system of claim 18, further comprising:

a storage location holding a pointer indicator bit to indicate the use of the speculative buffer or the committed buffer for reading a return address.

22. The system of claim 21, wherein the two part return address buffer is operable to, when the pointer indicator bit indicates the speculative buffer is to be used for reading the return address, read the return address from the speculative buffer and set the read pointer equal to a value of the back pointer field of an entry being read.

23. The system of claim 22, further comprising:

a retirement logic block that indicates instructions that have completed execution in the processor, wherein when the retirement logic indicates a CALL instruction has completed execution, the return address corresponding to the completed instruction is written from the speculative buffer to the committed buffer.

* * * * *